United States Patent [19]

Summers

[11] Patent Number: 4,900,204
[45] Date of Patent: Feb. 13, 1990

[54] ELASTIC SPIDER WEB CARGO RESTRAINT DEVICES

[75] Inventor: Robert M. Summers, Redmond, Wash.

[73] Assignee: Spidy Gear International, Inc., Woodinville, Wash.

[21] Appl. No.: 338,807

[22] Filed: Apr. 14, 1989

[51] Int. Cl.$^4$ .............................................. B61D 45/00
[52] U.S. Cl. ...................................................... 410/97
[58] Field of Search ....................... 104/96, 97, 98, 99; 53/461, 459

[56] References Cited

U.S. PATENT DOCUMENTS 2,705,461  4/1955  Cambell ................................. 410/97

*Primary Examiner*—Andres Kashnikow
*Assistant Examiner*—Virna Lissi Mojica
*Attorney, Agent, or Firm*—Christensen, O'Connor, Johnson & Kindness

[57] ABSTRACT

Elastic, spider web shaped devices for restraining cargo located in the bed of a truck or trailer are disclosed. Elastic, spider web shaped, cargo restraint devices for both holding down loads and for enclosing the open tailgate area of a truck or trailer are disclosed. The spider web shaped cargo restraint devices are formed of pieces of tough, elongated, stretchable material, e.g., bungee or shock cord. The pieces include two or more generally concentric loops and a plurality of radial arms laid out in a spider web shape. The concentric loops are spaced apart and surround a center device, such as a stainless steel ring, a metal plate or a piece of rigid plastic. The inner ends of the radial arms are attached to the center device and radiate outwardly. Where the loops and arms cross, they are joined by "hog" rings, or some other suitable attachment element. Depending upon strength requirements, the outer loop may be formed of the same strength shock cord as the inner loop(s) and the radial arms, or by stronger shock cord. The outer loop is attachable to the side wall surrounding the bed of the truck or trailer or to the edges of an open tailgate area in various ways. Cleats or hooks permanently affixed to the adjacent edges of the region to be enclosed are two examples of suitable attachment devices. Alternatively, hooks attached to the outer loop and designed to engage preformed regions of the surrounding edges can be used. Further, webs formed in accordance with the invention can be combined with an underlying cover when the load to be held down is formed of particulate material.

14 Claims, 4 Drawing Sheets

ELASTIC SPIDER WEB CARGO RESTRAINT DEVICES

TECHNICAL AREA

This invention relates to cargo restraint devices and, more particularly, to webbed cargo restraint devices.

BACKGROUND OF THE INVENTION

Trucks and trailers, both large and small, are used to transport cargo from one location to another. Such cargo varies from relatively heavy items to relatively light items, including particulate material. While it is occasionally desirable to provide some mechanism for restraining the movement of heavy items during transportation, it is often absolutely necessary to provide some mechanism for restraining the movement of light items, particularly items light enough to be dislodged from the truck or trailer during transportation. In the past, cargo frequently has been restrained by wrapping a rope back and forth across the cargo. In cases of relatively light cargo, such as sand or other light particulate material, an impervious sheet, such as a canvas sheet, is frequently first laid atop the load. The sheet and the cargo are held down by wrapping a rope back and forth across the load. Because this procedure is time consuming, it is undesirable. More recently, nets formed of inelastic synthetic materials, e.g., nylon, have become available for use in restraining cargo in the bed of a pickup truck. Because such webs are inelastic, they severely restrict the amount of cargo that can be carried. The present invention is directed to providing a web that overcomes this disadvantage.

More recently, a net designed to overlie a load held in a basket mounted atop the bars of an automobile roof rack has become available. The net appears to have a standard cross-hatched configuration and is formed of a high strength stretch cord with attachment hooks located at predetermined points along the periphery of the net. While such a net is useful with variable size cargo, it has a number of disadvantages. Because of the structural shape of the net, tension is limited to the area of the net that is stretched by the cargo. Because stretch force does not pull from a central location, it does not pull across the entire net. Further, the positioning of the net hold down hooks is limited to specific locations. Equally important, the net does not retain a taut shape when not covering a load. Also the configuration of the net is such that it has a tendency to tangle when stored. The present invention is directed to overcoming these and other disadvantages. In particular, the invention is directed to providing an elastic device that is ideally suited for use in restraining cargo in the bed of a truck or trailer.

SUMMARY OF THE INVENTION

In accordance with this invention, elastic, spider web shaped devices for restraining cargo in the bed of a truck or trailer are provided. Depending upon their intended use, the elastic, spider web shaped, cargo restraint devices can be sized to overlie and hold down cargo, or fill the open tailgate area of a truck or trailer. The spider web shaped cargo restraint devices are formed of pieces of tough, elongated, stretchable material, e.g., bungee or shock cord. The pieces include two or more concentric loops and a plurality of radial arms laid out in a spider web shape. The concentric loops are spaced apart and surround a center device that, depending on use, may take the form of a ring or a metal or plastic plate. The inner ends of the arms are affixed to the center device and radiate outwardly. Where the loops and arms cross, they are joined by a suitable attachment device, such as a "hog" ring.

In accordance with the further aspects of this invention, the outer loop of the spider web shaped cargo restraint device is formed of a stronger material than are the other elastic elements, i.e., the inner loop(s) and the radial arms.

In accordance with other aspects of this invention, hooks or other mechanisms for attaching the outer loop of the spider web shaped cargo restraint device to the side walls of the bed of a truck or trailer are provided.

In accordance with still further aspects of the invention, a spider web shaped cargo restraint device formed in accordance with the invention is combined with an underlying cover including peripheral holes through which the outer loop passes. Preferably, hooks or other mechanisms are included to attach the portion of the loop that passes through the holes to the outer face of the side walls of the bed of a truck or trailer.

In accordance with yet other aspects of this invention, the elastic, spider web shaped, cargo restraint devices formed in accordance with the invention to fill the open tailgate area of a truck or trailer bed include attachment devices for attaching the edges of the device to the end of the walls and bottom of the bed that surround and define the opening. Preferably, the attachment devices include peripheral tabs with grommeted holes.

As will be readily appreciated from the foregoing description by those skilled in the art and others, this invention provides elastic, spider web shaped, cargo restraint devices that overcome the disadvantages of the prior art. Because the spider webs are formed of elastic material, a cargo restraint device formed in accordance with the invention overcomes the disadvantages of inelastic webs. Moreover, the spider web shape, i.e., a shape with arms radiating outwardly from a central location and concentric rings results in cargo restraint devices that overcome the disadvantages of elastic nets of the type briefly described above. A spider web shape has greater expandability due to the fact that the radial arms will stretch to their full length, whereas a stretch net of the type incorporated in the product briefly described above will largely stretch only in the area of the "cell" requiring stretching. When a spider web shaped cargo restraint device formed in accordance with the invention is under tension, the radial arms cause the web to accept the tensions diametrically all the way across the load. Further, because a spider web includes an outer loop, attachment devices can be located any place around the perimeter as opposed to predetermined points. Obviously, this arrangement provides greater flexibility. Equally important, when an elastic, spider web shaped, cargo restraint device formed in accordance with the invention is expanded, the "holes" expand only in one direction, whereas the "holes" or "cells" of the configuration implemented in the product briefly described above expand and enlarge in both directions. As a result, objects are less likely to slip through a spider web shaped cargo restraint device. Also, if suitably sized, an elastic, spider web shaped, cargo restraint device formed in accordance with the invention retains a taut shape when installed across the bed of a pickup truck or trailer even when not covering a load. Further, the spider web shape reduces the possibility of tangling or "bird nesting" when a device formed in accordance with this invention is balled up and stored under the seat of a truck or in some other compartment.

BRIEF DESCRIPTION OF THE DRAWINGS

The foregoing objects and many of the attendant advantages of this invention and will become more readily appreciated as the same becomes better understood by reference to the following detailed description when taken in conjunction with the accompanying drawings wherein.

DESCRIPTION OF THE PREFERRED EMBODIMENTS

Figure 1:
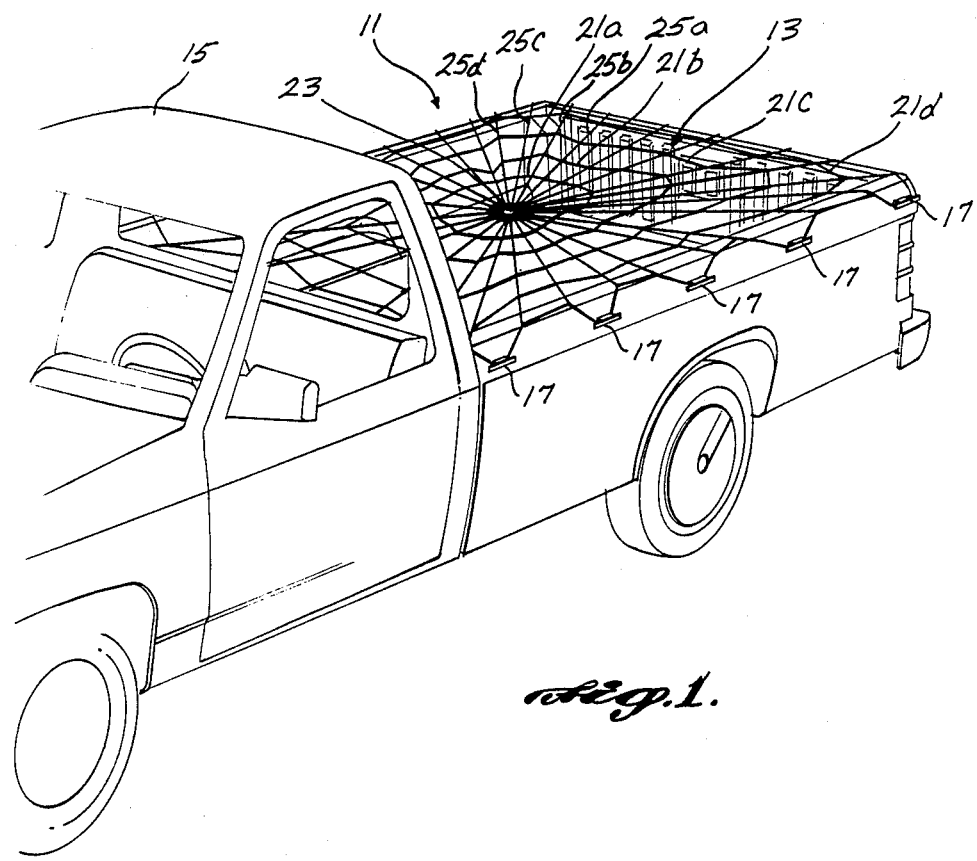
FIG. 1 is a pictorial view illustrating an elastic, spider web shaped, cargo restraint device formed in accordance with the invention covering the bed of a pickup trailer that does not contain a load.
Figure 2:
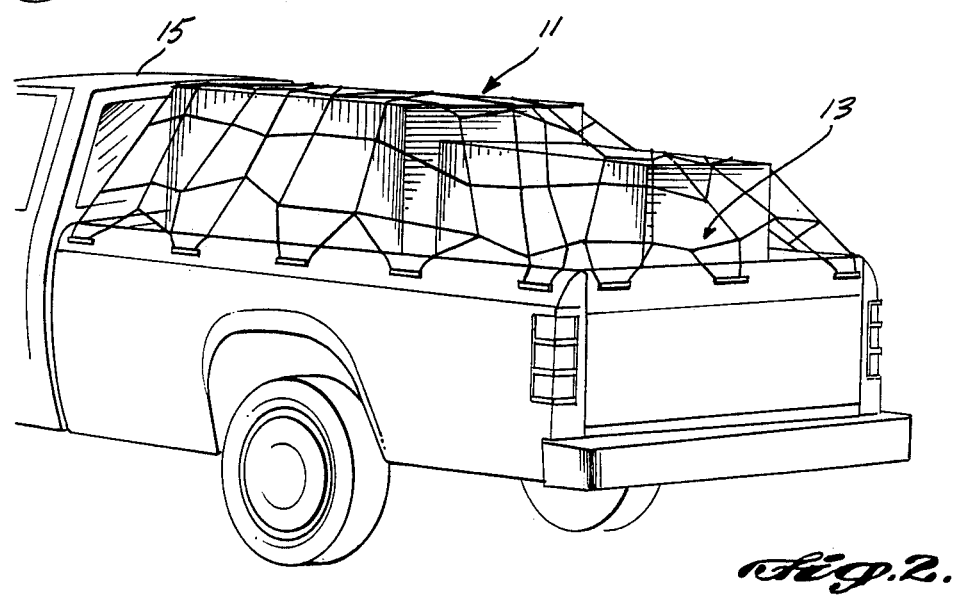
FIG. 2 is a pictorial view of an elastic, spider web shaped, cargo restraint device formed in accordance with the invention restraining a load in the bed of a pickup truck.

As illustrated best in FIGS. 1 and 2, an elastic, spider web shaped, cargo restraint device 11 formed in accordance with the invention is sized to overlie the bed 13 of the cargo carrying vehicle, such as a truck or trailer. While a pickup truck 15 is the vehicle illustrated in FIGS. 1 and 2, it is to be understood that the vehicle could be a trailer of the type pulled by an automobile, a trailer of the type pulled by a truck tractor or a larger truck.

The elastic, spider web shaped, cargo restraint device 11 is sized to be pulled taut both when no cargo is being carried (FIG. 1) as well as when a cargo is being carried (FIG. 2). As will be better understood from the following description of preferred embodiments of the invention, if the side walls of the vehicle include hold down cleats 17, as do many foreign built pickup trucks, the elastic, spider web shaped, cargo restraint device can be directly attached. Alternatively, hooks, or other attachment mechanisms, can be utilized to attach elastic, spider web shaped cargo restraint devices formed in accordance with the invention to the walls of the bed of cargo carrying vehicles.

Figure 3:
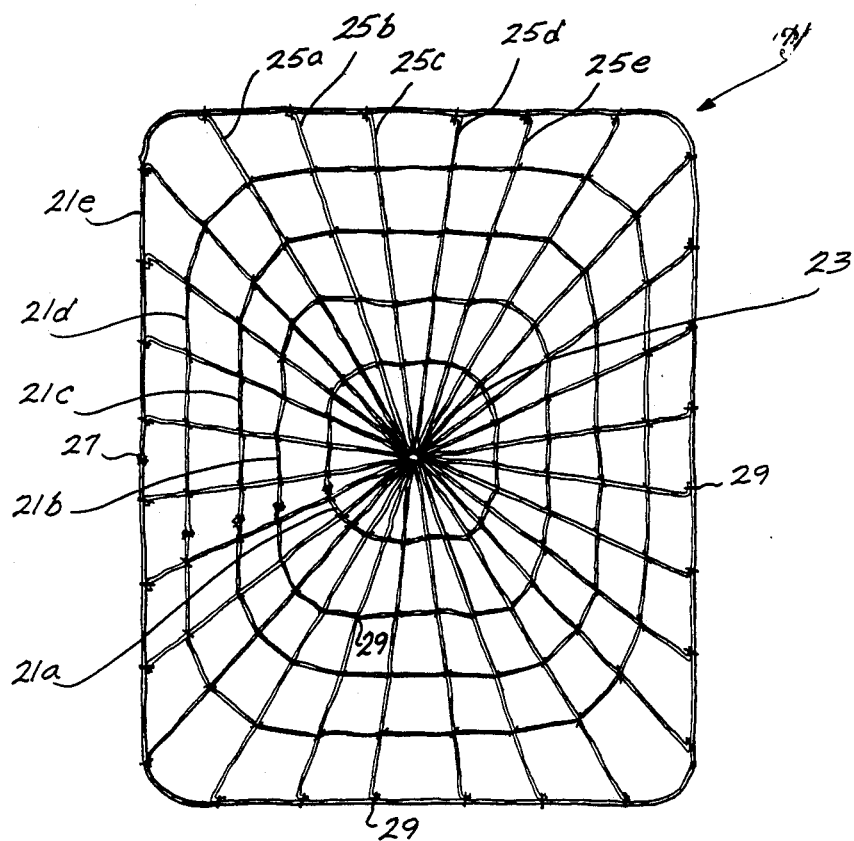
FIG. 3 is a plan view of an elastic, spider web shaped, cargo restraint device formed in accordance with the invention.

FIG. 3 is a plan view of an elastic, spider web shaped, cargo restraint device 11 formed in accordance with the invention. As shown in FIGS. 1 and 2 and better in FIG. 3, an elastic, spider web shaped, cargo restraint device formed in accordance with this invention comprises a plurality of spaced-apart concentric loops 21a, 21b . . . 21n, all surrounding a center device 23. In the case of a cargo restraint device designed to hold down cargo in the bed of a truck or trailer, the center device 23 is, preferably, a ring formed of a suitably strong material that is noncorrosive, e.g. a stainless steel ring. Radiating outwardly from the center device 23 are a plurality of radial arms 25a, 25b, 25c . . . 25n. Both the concentric loops 21a, 21b, 21c . . . 21n and the radial arms 25a, 25b, 25c . . . 25n are formed of pieces of tough, elongated, stretchable material, e.g., bungee or shock cord.

Figure 4:
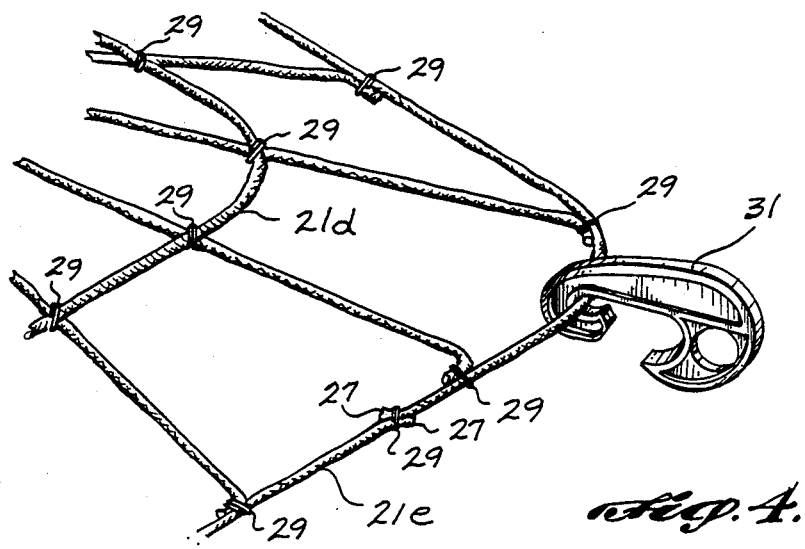
FIG. 4 is an enlarged view of a hook suitable for attaching the outer loop of an elastic, spider web shaped, cargo restraint device formed in accordance with the invention to the surrounding side walls of a truck or trailer bed.
Figure 9:
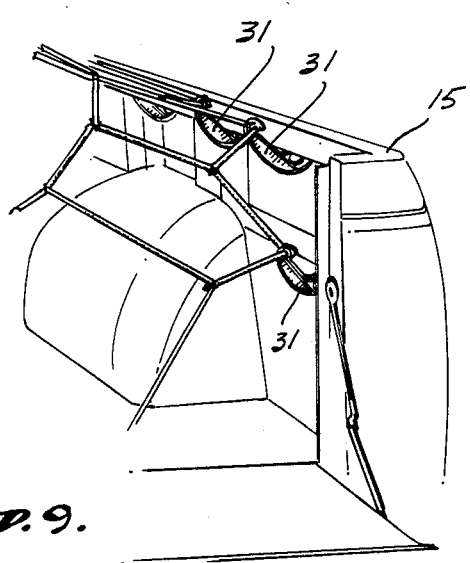
FIG. 9 illustrates how hooks of the type illustrated in FIG. 4 can be used to attach an elastic, spider web shaped, cargo restraint device to the rolled-over side wall of a pickup truck cargo bed.

As illustrated best in FIG. 4, the concentric loops 21 are formed by overlapping the ends 27 of shock cord and attaching the overlapping ends together using a suitable attachment means, such as a "hog" ring 29. Other suitable attachment media, including winding a tough inelastic cord about the overlapping ends, similar to the way the ends of nautical ropes and lines are "whipped", can be utilized to attach the ends of the shock cord together to create loops. The radial arms 25a, 25b, 25c . . . 25n are attached to the loops 21a, 21b, 21c . . . 21d where they overlap by using similar attachment devices, i.e., "hog" rings 29. The inner ends of the radial arms are attached to the center device 23 by looping the ends through a hole in the center device and attaching the bitter end of each loop to the other end using a similar attachment device, i.e., a hog ring. The end result is a spider web shaped cargo restraint device. The outer loop 21e of the spider web shaped cargo restraint device 11 may be the same as the other concentric loops and the radial arms or may be larger and stronger, if additional peripheral strength is desired. Regardless of how it is sized, as illustrated in FIG. 1, the spider web shaped cargo restraint device 11 can be attached to the top of the side walls of the bed of a truck or trailer by wrapping the outer loop around cleats 17. Alternatively, as shown in FIG. 4, hooks 31 can be used to attach the outer loop to the side walls. As shown in FIG. 9, in cases where the side walls of the cargo compartment include inwardly curled ends, the hooks 31 can be attached beneath the inward curls. Alternatively, other types of attachment mechanisms can be utilized. The end result is the periphery of the spider web shape load hold down device being affixed atop or adjacent the top of the side walls of the cargo compartment in a manner that allows the smaller concentric loops and the radial arms to constrain cargo lying beneath the cargo restraint device, as best shown in FIG. 2.

Figure 5:
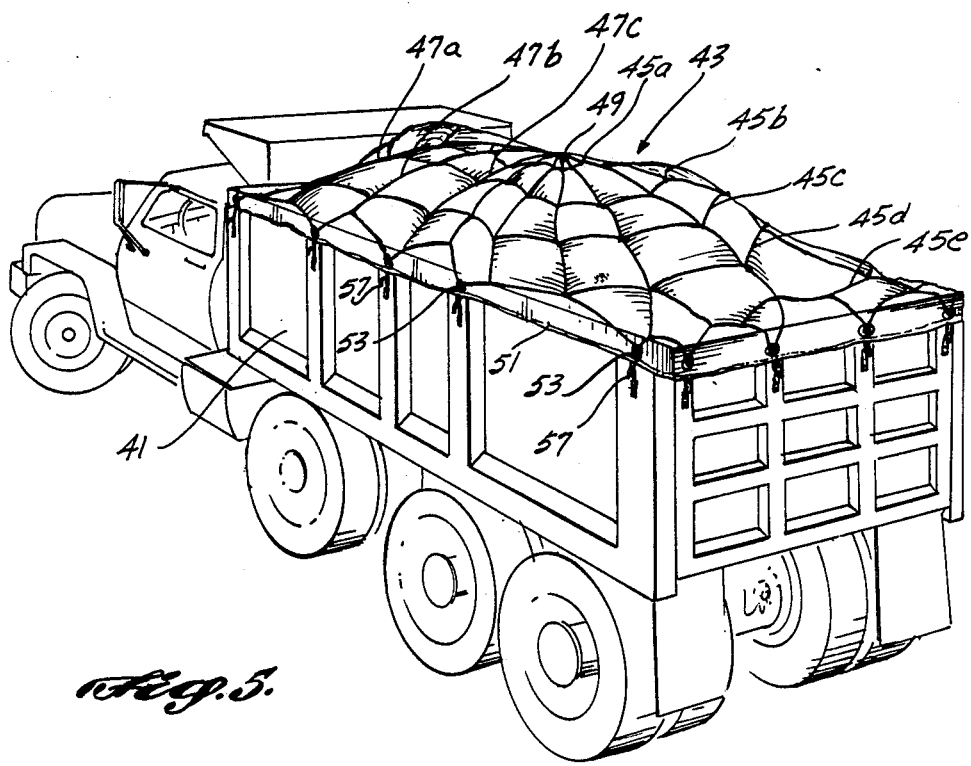
FIG. 5 is a pictorial view of an elastic, spider web shaped, cargo restraint device formed in accordance with the invention combined with an impervious underlying sheet mounted atop the walls of a trailer.
Figure 6:
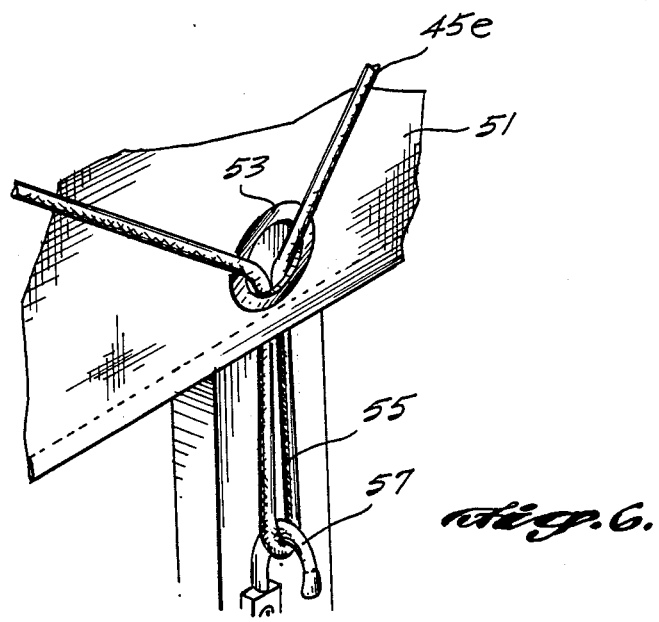
FIG. 6 is an enlarged view of a portion of the edge of the embodiment of the invention illustrated in FIG. 5.

FIGS. 5 and 6 illustrate an embodiment of the invention designed for use atop a large truck or larger truck trailer 41, particularly one designed to transport relatively lightweight particulate material, i.e., fruit, hay, sand, dirt, small gravel, etc. The trucks or truck trailers can include a fixed bed or a "dump" bed. The elastic, spider web shaped, cargo restraint device 43 illustrated in FIG. 5, like the embodiment of the invention illustrated in FIGS. 1-4, is formed of a plurality of concentric loops 45a, 45b, etc., and radial arms 47a, 47b, etc., emanating from a center device such as a stainless steel ring 49. Both the loops and the radial arms are formed of tough, elongated, stretchable material, e.g., bungee or shock cord. The embodiment of the invention illustrated in FIGS. 5 and 6 also includes an impervious layer 51 located beneath the cargo restraint device 43. Such a combination is particularly desirable when the material to be transported is particulate material whose size is smaller than the size of the holes in the elastic, spider web shaped, cargo restraint device 43. Preferably, the impervious sheet 51 includes a plurality of peripheral holes 53 through which the outer loop (designated 45e) of the elastic, spider web shaped, cargo restraint device 43 can pass. More specifically, the hole diameters are larger than two diameters of the outer loop 45e. The portions 55 of the outer loop 45e that pass through the holes 53 are attached to the outer surface of the side walls of the truck trailer 41 by any suitable mechanism, such as by looping around hooks 57, as illustrated in FIG. 6. A suitable impervious material is canvas.

Figure 7:
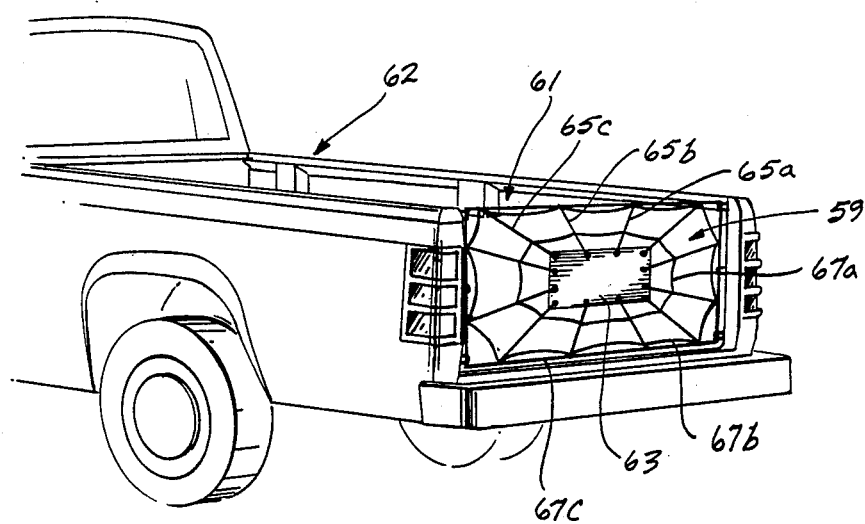
FIG. 7 is a pictorial view of a spider web shaped cargo restraint device formed in accordance with the invention suitable for enclosing the open tailgate end of a pickup truck.
Figure 8:
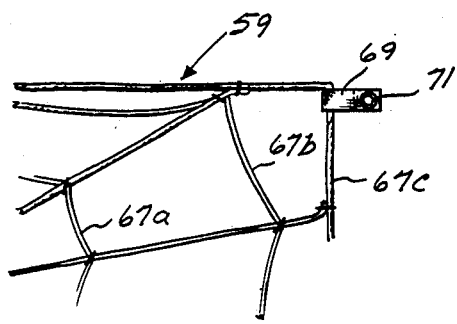
FIG. 8 illustrates a mechanism formed in accordance with the invention for attaching the elastic, spider web shaped, cargo restraint device illustrated in FIG. 7 to the ends of the walls and the bottom of the open end, i.e., tailgate end, of the bed of a truck or trailer.

FIGS. 7 and 8 illustrate an elastic, spider web shaped, cargo restraint device 59 formed in accordance with the invention sized to fill the tailgate opening 61 of a pickup truck 62. Like the other embodiments of the invention, the tailgate enclosing elastic, spider web shaped, cargo restraint device 59 includes a center device 63. While the center device 63 could be a stainless steel ring, preferably, it is a nonelastic plate formed of a rigid material, such as metal or a rigid plastic. The plate can be utilized to support a trademark or other visually interesting material, i.e., a slogan, if desired. Attached to and extending radially outwardly from the plate 63 are a plurality of arms 65a, 65b, 65c ... 65n. Surrounding the center device 63 are two or more concentric loops 67a, 67b, etc. As with the other embodiments of the invention, the radially extending arm 65a, 65b, 65c ... 65n and the loops 67a, 67b, etc., are attached to one another by "hog" rings or some other suitable attachment media. Attached to the outer loop 67b and located about the periphery of the tailgate enclosing spider web shaped cargo restraint device 61 are a plurality of tabs 69. The tabs are positioned so as to be near the adjacent regions of the edges of the side walls and the bottom of the bed of the truck 62 when the tailgate enclosing spider web shaped cargo restraint device 13 suitably positioned in the truck tailgate opening. Preferably, the tabs include grommeted holes 71, which are used to attach the edges of the tailgate enclosing spider web shaped cargo restraint device 63 to cleats, hooks or similar devices permanently affixed to the side walls and bottom surrounding the tailgate opening.

As can be readily appreciated from the foregoing description, the invention provides spider web shaped cargo restraint devices suitable for holding cargo down and/or in the cargo bed of a truck or trailer. The spider web shape of the cargo restraint devices formed in accordance with this invention greatly enhances the applicability and use of such devices when compared to prior art nonelastic devices as well as elastic devices that are less stretchable than the present invention. More specifically, the use of radial arms stretching from a center point greatly enhances the distance and elasticity of a spider web design when compared to conventional cross-hatched net designs.

While preferred embodiments of the invention have been illustrated and described, it is to be understood that various changes can be made herein without departing from the spirit of the invention. Consequently, with the scope of the appended claims, it is to be understood that the invention can be practiced otherwise than as specifically described herein.

The embodiments of the invention which an exclusive property or privilege is claimed are defined as follows:

1. An elastic, spider web shaped, cargo restraint device, comprising:
    a center device;
    at least two spaced-apart concentric loops formed of tough, elongate, stretchable material surrounding said center device;
    a plurality of radial arms also formed of tough, elongate, stretchable material affixed to and extending outwardly from said center device; and
    attachment means for attaching said radial arms to said loops where said radial arms cross said loops.

2. The elastic, spider web shaped, cargo restraint device claimed in claim 1, wherein said center device is a ring located at the center of said two loops and wherein the inner ends of said radial arms are attached to said ring.

3. The elastic, spider web shaped, cargo restraint device claimed in claim 1 or 2, wherein said attachment means comprises encircling means for encircling the points where said radial arms cross said loops.

4. The elastic, spider web shaped, cargo restraint device claimed in claim 3, wherein said encircling means are hog rings.

5. The elastic, spider web shaped, cargo restraint device claimed in claim 1, including an impervious layer, said impervious layer including peripheral holes through which the outer loop of said at least two concentric loops pass.

6. The elastic, spider web shaped, cargo restraint device claimed in claim 5, wherein said center device is a ring located at the center of said two loops and wherein the inner ends of said radial arms are attached to said ring.

7. The elastic, spider web shaped, cargo restraint device claimed in claim 5 or 6, wherein said attachment means comprises encircling means for encircling the points where said radial arms cross said loops.

8. The elastic, spider web shaped, cargo restraint device claimed in claim 3, wherein said encircling means are hog rings.

9. The elastic, spider web shaped, cargo restraint device claimed in claim 1, wherein said centering device is a plate and wherein the inner ends of said radial arms are attached to said plate.

10. The elastic, spider web shaped, cargo restraint device claimed in claim 9, wherein said attachment means comprises encircling means for encircling the points where said radial arms cross said loops.

11. The elastic, spider web shaped, cargo restraint device claimed in claim 10, wherein said encircling means are hog rings.

12. The elastic, spider web shaped, cargo restraint device claimed in claim 9, including attachment tabs located about the periphery of the outer loop of said at least two concentric loops.

13. The elastic, spider web shaped, cargo restraint device claimed in claim 12, wherein said attachment means comprises encircling means for encircling the points where said radial arms cross said loops.

14. The elastic, spider web shaped, cargo restraint device claimed in claim 13, wherein said encircling means are hog rings.

* * * * *